(12) United States Patent
Nauka et al.

(10) Patent No.: US 10,919,217 B2
(45) Date of Patent: Feb. 16, 2021

(54) THREE-DIMENSIONAL (3D) PRINTING BUILD MATERIAL COMPOSITION

(71) Applicant: Hewlett-Packard Development Company, L.P., Houston, TX (US)

(72) Inventors: Krzysztof Nauka, Palo Alto, CA (US); Howard S. Tom, San Jose, CA (US); Kristopher J. Erickson, Palo Alto, CA (US); Lihua Zhao, Sunnyvale, CA (US); Sivapackia Ganapathiappan, Los Altos, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 82 days.

(21) Appl. No.: 15/568,979

(22) PCT Filed: Jul. 23, 2015

(86) PCT No.: PCT/US2015/041745
§ 371 (c)(1),
(2) Date: Oct. 24, 2017

(87) PCT Pub. No.: WO2017/014784
PCT Pub. Date: Jan. 26, 2017

(65) Prior Publication Data
US 2018/0126631 A1    May 10, 2018

(51) Int. Cl.
*B29C 64/153* (2017.01)
*C08K 5/00* (2006.01)
*C08L 77/02* (2006.01)
*B33Y 70/00* (2020.01)
*C08K 3/20* (2006.01)
*C08K 3/22* (2006.01)
*C08K 3/32* (2006.01)
(Continued)

(52) U.S. Cl.
CPC ............ *B29C 64/153* (2017.08); *B33Y 70/00* (2014.12); *C08K 3/20* (2013.01); *C08K 3/22* (2013.01); *C08K 3/30* (2013.01); *C08K 3/32* (2013.01); *C08K 5/00* (2013.01); *C08K 5/0091* (2013.01); *C08L 71/12* (2013.01); *C08L 77/02* (2013.01); *C08L 101/00* (2013.01); *C08L 101/12* (2013.01); *C08K 2003/2248* (2013.01); *C08K 2201/005* (2013.01)

(58) Field of Classification Search
None
See application file for complete search history.

(56) References Cited

U.S. PATENT DOCUMENTS 5,712,332 A    1/1998   Kaieda et al.
7,922,859 B2 *  4/2011  Rosenberger ....... B29C 65/1677
                                            156/272.8
(Continued)

FOREIGN PATENT DOCUMENTS

CN    102341448    2/2012
CN    1976799     4/2012

*Primary Examiner* — Tae H Yoon
(74) *Attorney, Agent, or Firm* — HPI Patent Department

(57) ABSTRACT

A three-dimensional printing build material composition includes a polymer particle, and a radiation absorbing additive mixed with the polymer particle. The radiation absorbing additive has a particle size ranging from about 1 μm to about 100 μm, and the radiation absorbing additive is to absorb incident radiation having wavelengths ranging from 700 nm to 10 μm.

18 Claims, 8 Drawing Sheets

(51) Int. Cl.
    *C08L 101/00* (2006.01)
    *C08K 3/30* (2006.01)
    *C08L 71/12* (2006.01)
    *C08L 101/12* (2006.01)

(56) References Cited

U.S. PATENT DOCUMENTS

| | | |
|---|---|---|
| 7,968,626 B2 | 6/2011 | Giller et al. |
| 8,399,547 B2 | 3/2013 | Meyer et al. |
| 8,853,314 B2 | 10/2014 | Mamak et al. |
| 9,321,244 B2 * | 4/2016 | Terfloth .................... C09J 5/02 |
| 2006/0134419 A1 | 6/2006 | Monsheimer et al. |
| 2007/0183918 A1 | 8/2007 | Monsheimer et al. |
| 2007/0238056 A1 | 10/2007 | Baumann et al. |
| 2007/0241482 A1 | 10/2007 | Giller et al. |
| 2008/0122141 A1 | 5/2008 | Bedal et al. |
| 2009/0130451 A1 * | 5/2009 | Farrell ................ B29C 65/1616 428/411.1 |
| 2009/0152771 A1 | 6/2009 | Philippi et al. |
| 2011/0017952 A1 * | 1/2011 | Kambe .................. B82Y 20/00 252/301.36 |
| 2012/0021152 A1 | 1/2012 | Glaser et al. |
| 2013/0140806 A1 | 6/2013 | Wilkinson |
| 2015/0024169 A1 | 1/2015 | Martin |

* cited by examiner

ADDITIVE 11-1

THREE-DIMENSIONAL (3D) PRINTING BUILD MATERIAL COMPOSITION

CROSS-REFERENCE TO RELATED APPLICATION

This application is a 371 National Stage Application, which claims the benefit of International Application No. PCT/US2015/041745, filed on Jul. 23, 2015, the content of which is hereby incorporated by references in its entirety.

BACKGROUND

Three-dimensional (3D) printing may be an additive printing process used to make three-dimensional solid objects from a digital model. 3D printing is often used in rapid product prototyping, mold generation, and mold master generation. 3D printing techniques are considered additive processes because they involve the combined application of successive layers of material. This is unlike traditional machining processes, which often rely upon the removal of material to create the final object. Materials used in 3D printing often require curing or fusing, which for some materials may be accomplished using heat-assisted sintering, and for other materials may be accomplished using digital light projection technology. Other 3D printing processes utilize different mechanisms, e.g., printing a binder glue, for creating 3D shapes.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of a three-dimensional (3D) printing build material composition disclosed herein include an additive(s) capable of increasing the amount of irradiated energy that is turned into build material composition/powder heating. In an example, this additive is uniformly distributed within the build material composition used in the 3D printing.

Previous methods for selectively fusing portions of particle layers to form solid 3D articles generally include repeating a sequence such as (1) dispensing a powder layer; and then (2) selectively directing heat energy to a portion of the powder layer that is to be part of the 3D article. The heat energy may be applied through a laser (e.g., selective laser sintering (SLS)) or by selectively depositing an absorber and applying "blanket radiation." However, the present inventors have discovered that, in some instances, due to a relatively high crystallization temperature and melting temperature of a polymer powder or due to extended exposure time or undesirably high radiation power required to melt the polymer powder to form a 3D printed object, it may be difficult (or not possible) to achieve sufficient polymer powder melting.

Initial heating of a polymer powder build composition generally relies on the capability of the powder to absorb radiation from the heater lamp(s). However, an uncolored/white polymer powder may absorb a low amount of radiation (e.g., due to reflected radiation). Further, there may be heat loss to the ambient environment from the surface of the heated powder. Still further, there are power limits of the heater lamp(s).

Examples of the build material composition, method and system disclosed herein allow production of 3D articles from a wide variety of polymers (including those having high melting points, e.g., over about 200° C.), within an acceptable heating time (e.g., 15 seconds or less), and within an acceptable power range applied to a bank of heating lamps. The applied power depends, in part, upon the area of the heated powder. In an example, the applied power range is about 5 W/cm$^2$ (which is approximately the total electrical power consumed by the lamp divided by the area of the powder bed). These parameters may enable a wider range of polymer powder materials from which to choose, while generally avoiding damage or malfunction to printer metal parts that may result from excessive heating of the polymer powder material.

Figure 1:
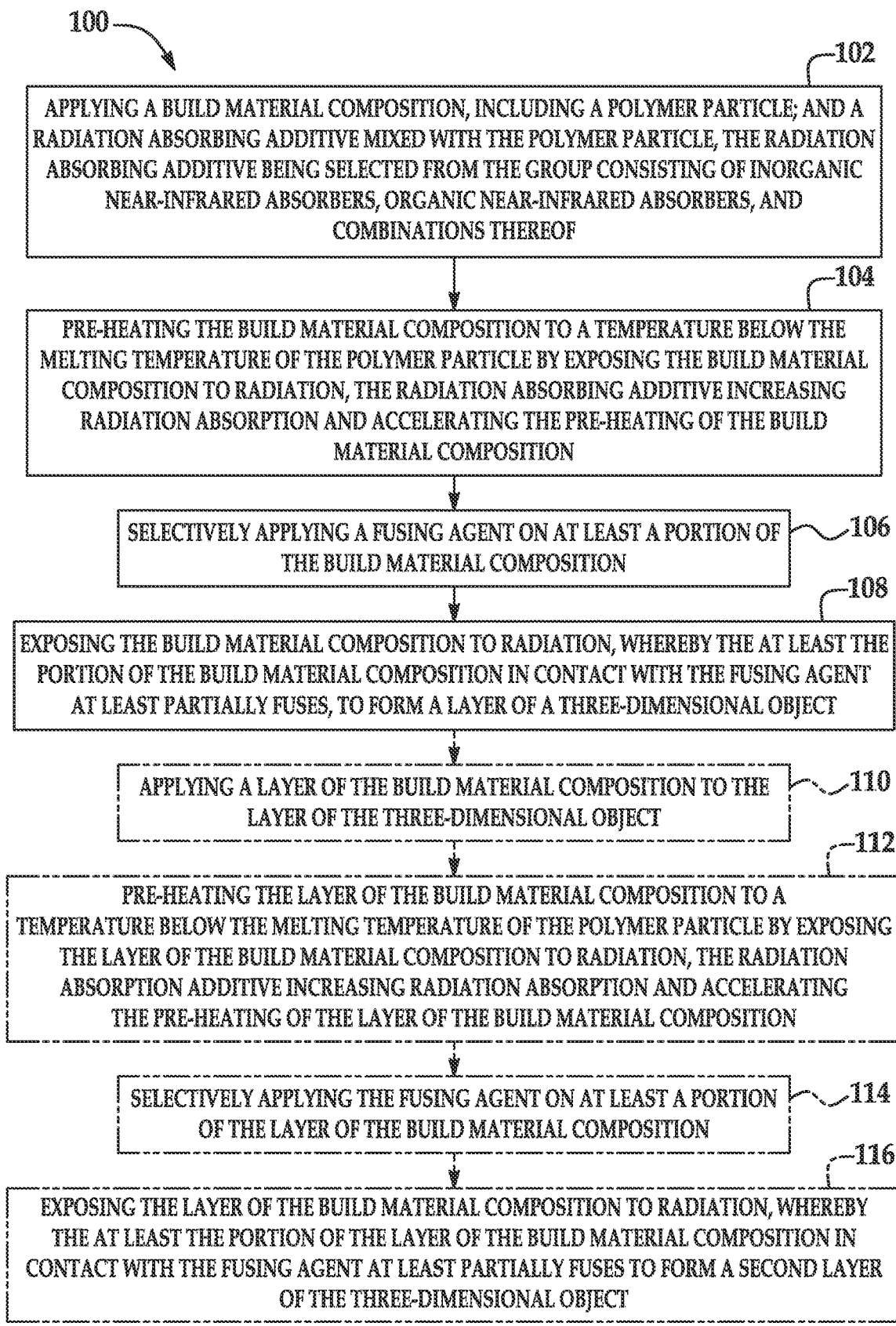
FIG. 1 is a flow diagram illustrating an example of a 3D printing method disclosed herein.

An example of the 3D printing method 100 is depicted in FIG. 1, and an example of the printing system 10 used throughout the method 100 is shown in FIGS. 3A through 3E. It is to be understood that the method 100 shown in FIG. 1 will be discussed in detail herein, and in some instances, FIGS. 2, and 3A through 3E will be discussed in conjunction with FIG. 1.

Figure 3A:
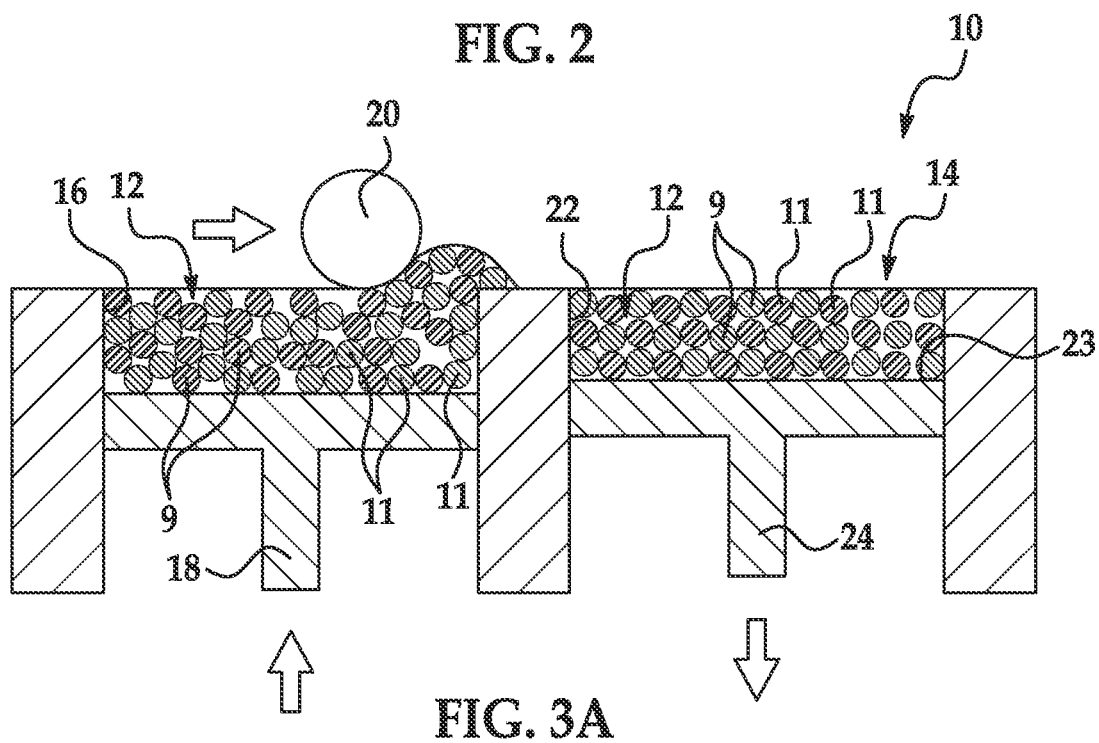
FIGS. 3A through 3D are semi-schematic, cross-sectional views showing formation of one layer of a 3D object using an example of the build material composition, 3D printing method and system disclosed herein.

As shown in FIG. 1 (at reference number 102) and in FIG. 3A, an example of the method 100 includes applying a build material composition 12 using the 3D printing system 10. In the example shown in FIG. 3A, one layer 14 of the build material composition 12 has been applied, as will be discussed in more detail below.

Figure 2:
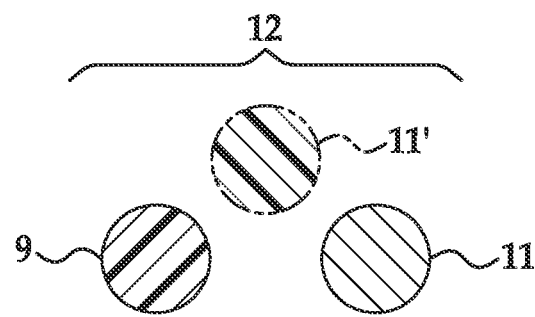
FIG. 2 is a semi-schematic cross-sectional view of examples of the build material composition used to form layer(s) of a 3D object.

An example of the build material composition 12 includes a polymer particle 9 and a radiation absorbing additive particle 11 and/or 11' mixed with the polymer particle 9, as shown in FIG. 2. In an example, the additive 11 and/or 11' is uniformly distributed within the build material composition 12. In a further example, a layer of the polymer particles 9 of the build material composition 12 may be introduced into the printing system 10 first, and then an additive 11/11' powder layer may be disposed thereon (e.g., by applying/printing) as a substantially continuous coverage coating over the polymer particle 9 powder layer. In yet a further example, a layer of the polymer particles 9 of the build material composition 12 may be introduced into the printing system 10 first, and then an additive 11/11' powder layer may be disposed thereon (e.g., by applying/printing) to selected areas of, and/or in varying concentrations on the polymer particle 9 powder layer.

The applying/disposing of the radiation absorbing additive 11, 11' to the polymer particles 9 may include dissolving or dispersing the radiation absorbing additive 11, 11' in a liquid; and then applying the liquid (having the radiation absorbing additive 11, 11' dissolved or dispersed therein) to the polymer particles 9. Examples of suitable liquids include water, acetic acid, alcohols (e.g., methanol, ethanol, propanol, isopropanol, etc.), liquefied gases (e.g., $CO_2$), and combinations thereof.

Additive(s) 11 and/or 11' is/are capable of increasing radiation absorbance and accelerating the pre-heating of the build material composition 12. In an example, the radiation absorbing additive is selected from the group consisting of inorganic near-infrared (near-IR) absorbers 11, organic near-infrared (near-IR) absorbers 11', and combinations thereof. It is to be understood that any example of the build material composition 12 may be used in the method 100 and the system 10 disclosed herein.

The radiation absorbing additive 11, 11' can be a particle having a particle size generally below 1 mm. In an example, the radiation absorbing additive 11, 11' is a particle having a particle size ranging from about 1 μm to about 100 μm. In another example, the radiation absorbing additive 11, 11' is a particle having a particle size ranging from about 10 μm to about 60 μm. The additive 11, 11' is to absorb incident radiation having a wavelength within a range from about 700 nm to about 10,000 nm. The radiation absorbing additive 11, 11' also may weakly absorb radiation having a wavelength within a range from about 600 nm to about 700 nm. By "may weakly absorb" it is meant that the additive 11, 11' may or may not absorb radiation having wavelengths in a range from about 600 nm to about 700 nm; and if it does absorb, the additive 11, 11' absorbs less than 10% of radiation having wavelengths in a range from about 600 nm to about 700 nm. As used herein, "near-infrared" is meant to include radiation having a wavelength within a range from about 600 nm to about 3000 nm; or within a range from about 650 nm to about 3000 nm; or within a range from about 700 nm to about 2500 nm.

An example of the build material composition 12 includes a mixture of from greater than 0 vol % to about 4 vol % of the radiation absorbing additive 11, 11' with from about 96 vol % to less than 100 vol % of the polymer particle 9 (with respect to a total vol % of the build material composition 12). It is to be understood that the vol % of the polymer particle 9 may be lower if other additives (e.g., charge agents, flow aids, antioxidants, etc.) are included in the build material composition 12. In other examples, the radiation absorbing additive 11, 11' may make up from about from about 0.1 vol % to about 2 vol % of the total vol % of the build material composition 12, or from about 0.1 vol % to about 1 vol % of the total vol % of the build material composition 12. In an example, when the radiation absorbing additive 11, 11' is applied/disposed on a layer of the polymer particles 9 to form the build material composition 12, the applying includes adding the radiation absorbing additive 11, 11' in an amount ranging from greater than 0 vol % to about 4 vol % of a total volume percent of the build material composition 12.

An increase in the amount of heat produced within the powder build material composition 12 is due to the high absorbance of the additive 11, 11'. Even a small amount of additive 11, 11' (e.g., less than a few vol %) may produce a significant increase of build material composition 12 temperature when irradiated with a heating lamp. In an example, the build material composition 12 is to absorb from about 1.5 times to about 10 times more of the incident radiation (e.g., incident radiation having wavelengths ranging from 700 nm to 10 μm) when compared to a build material composition including the polymer particle 9 without the radiation absorbing additive 11, 11'. In another example, the build material composition 12 is to absorb from about 1.5 times to about 5 times more of the incident radiation when compared to a build material composition including the polymer particle 9 without the radiation absorbing additive 11, 11'. This is achieved due to a very high absorbance of the additive 11, 11' within the emission range of the heating lamps, which is generally in the range from about 0.8 μm (800 nm) to about 2.5 μm (2500 nm). At 2.5 μm (2500 nm), the absorbance of the additive 11, 11' may be about 0.7 of absorbance units. On average, the absorbance of the additive 11, 11' is greater than 1.3.

Examples of additive(s) 11, 11' are compatible with the polymer particle 9 powder in terms of forming a mixture including the polymer particle 9 and the additive 11, 11'. Additive(s) 11, 11': are miscible with the polymer particle 9 powder within the thermal range encountered during 3D printing; do not decompose or evaporate prematurely (i.e., before polymer particle melting); and do not disrupt desired rheological properties of the polymer particle 9 powder. Additives 11, 11' are not reactive with polymer particles 9 (i.e., additive 11, 11' particles do not chemically react with polymer particles 9 when placed in contact therewith).

In terms of size, the additive(s) 11, 11' are similar in size to the polymer particle 9. By "similar in size", it is meant that the average particle size of the additive(s) 11, 11' and the average particle size of the polymer particle 9 do not differ by more than about 20 μm to about 40 μm. A minimal size differential between the polymer particle 9 and the additive(s) 11, 11' enables the additive(s) 11, 11' to be mixed substantially uniformly with the polymer particle 9 and reduces particle/additive segregation.

When added to the polymer particle 9 powder, examples of the additive 11, 11' do not significantly change the color of the polymer particle 9 powder, i.e., the color of the build material composition 12 generally remains the color of the polymer particle 9 powder, e.g., white (or close to white). A color that is "close to white" has color sRGB coordinates greater than or equal to 225. In some instances, a significant color change may adversely affect print selectivity during a 3D printing process. However, small amounts (e.g., up to 3% by volume) of additive 11, 11' having a color distinctly different from the white polymer particle 9 powder may be acceptable, as long as it does not substantially change the color of the build material composition 12 after the additive 11, 11' is uniformly dispersed within the polymer particle 9 powder. The color is considered to not be substantially changed as long as the RGB coordinates do not fall below 225. Beyond the allowable minor changes to the color (discussed herein) of the build material composition 12 after the additive 11, 11' has been mixed therein, other modifications of the properties of the polymer particle 9 that may decrease 3D printing selectivity are generally undesirable. For example, the additive 11, 11' may not modify the polymer particle flowability, hygroscopicity, agglomeration, etc.

However, it is to be understood that if the presence of even a small amount (e.g., up to 3% by volume) of additive(s) 11, 11' may degrade the properties of the polymer particle 9 powder, one may incorporate an additional agent into the build material composition 12 to correct this modification. For example, use of some of the additive 11, 11' examples recited herein may degrade flow capabilities of a polymer particle 9 powder. This can be compensated for by adding a small amount of a flow aid/agent (e.g., less than about 0.1 vol % (with respect to a total volume percent of the build material composition 12) of fumed silica).

The presence of examples of additive(s) 11, 11' with the polymer particle 9 powder does not deleteriously affect the mechanical properties of 3D parts/objects printed using examples of the build material composition 12 disclosed herein (as compared to 3D objects printed using a build material composition including the polymer particle 9 powder without additive(s) 11, 11'). In an example, a 3D part/object formed from the build material composition 12 has mechanical properties within (plus/minus) about 6% of the mechanical properties of a 3D part/object formed from a build material composition including the polymer particle 9 powder without the radiation absorbing additive 11, 11'.

It is contemplated as being within the purview of the present disclosure that more than one additive 11, 11' may be used. Use of more than one additive 11, 11' may enhance material absorbance within substantially an entire emission range of a heating lamp (e.g., a first additive 11, 11' may have a maximum absorption at around 1 μm, while a second additive 11, 11' may absorb best above 1.5 μm).

In an example, the radiation absorbing additive 11, 11', when mixed with the polymer particles 9, absorbs from about 0.5% to less than 20% of incident radiation having wavelengths ranging from 700 nm to 10 μm, and absorbs less than 0.01% of incident radiation having wavelengths below 700 nm.

The additive(s) 11, 11' may be synthesized/fabricated; or they may be commercially available.

In an example, the radiation absorbing additive 11 is an inorganic near-infrared absorber selected from the group consisting of copper doped metal oxides, copper phosphates, metal-copper(II) pyrophosphates, di-cation pyrophosphates, mixed metal iron diphosphates, magnesium copper silicate, copper hydroxide phosphate, metal oxides (some examples of which are transparent), semiconductor nanocrystals, and combinations thereof.

The radiation absorbing additive 11' in an example is an organic near-infrared absorber selected from the group consisting of cyanines, phthalocyanines, tetraaryldiamines, triarylamines, metal dithiolenes, rare earth complexes, non-conjugated polymers, conjugated quinoid type polymers, conjugated dye-containing polymers, donor-acceptor conjugated polymers, and combinations thereof.

In a further example, the radiation absorbing additive includes a combination of the inorganic near-infrared absorber 11 and the organic absorber 11'.

Some examples of additive materials 11, 11' are shown in Table 1 below.

TABLE 1

Examples of additive materials

| Class | Family | Example compounds | Tradename/Manufacturer |
|---|---|---|---|
| Inorganic | Cu-doped metal oxides | MgO:Cu | |
| | | ZnO:Cu | |
| | Cu-phosphates | $Cu_2P_2O_7$, $Cu_2P_4O_{12}$ | |
| | Metal-Cu(II) pyrophosphates | $CaCuP_2O_7$, $SrCuP_2O_7$, $Mg_{(2-x)}Cu_xP_2O_7$, $Zn_{(2-x)}Cu_xP_2O_7$ | |
| | Di-cation pyrophosphates | $(Mg,Cu)_2P_2O_7$, $(Zn,Cu)_2P_2O_7$ | |
| | Mixed metal iron diphosphates | $(Zn,Fe)_3(PO_4)_2$ | |
| | MgCu silicate | $Mg_{(2-x)}Cu_xSi_2O_6$ | |
| | Metal hydroxide phosphate | $Cu_2(OH)PO_4$ | /EMD PERFORMANCE MATERIALS |
| | Metal oxides | $VO_2$(nano), $SbSnO_2$, $NiCrO_x$, $CuFeMnO_4$, $IrO_x$, $Ta_2O_5$, ITO | Minatec ® 230 A-IR/ EMD PERFORMANCE MATERIALS |
| | Semiconductor nanocrystals | HgSe, HgTe, InAs, PbX (X = S, Se, Te), $LaB_6$ | |
| Organic, compound | cyanines | Multiple formulations | FHI 1002, FHI 10102, and FHI 10502/ Fabricolor, other examples are available from H. W. Sands, BASF, Sigma Aldrich, and Gentex |
| | phthalocyanines | Multiple formulations | FHI 9606, FHI 9506, and FHI 8506/Fabricolor, other examples are available from H. W. Sands, BASF, Sigma Aldrich, Gentex |

TABLE 1-continued

Examples of additive materials

| Class | Family | Example compounds | Tradename/Manufacturer |
|---|---|---|---|
| | tetraaryl diamine | Multiple formulations | FHI 994312S, FHI 104422P, and FHI 1072321/Fabricolor, other examples are available from H. W. Sands, BASF, Sigma Aldrich, and Gentex |
| | triarylamine | Multiple formulations | FHI 98811S, FHI 96715, and FHI 96716/Fabricolor, other examples are available from H. W. Sands, BASF, Sigma Aldrich, and Gentex |
| | Metal dithiolenes | Multiple formulations | FHI 84842, FHI 85642, and FHI 86042/Fabricolor, other examples are available from H. W. Sands, BASF, Sigma Aldrich, and Gentex |
| | Rare earth complexes | Multiple formulations | FHI 900L2, FHI 900L3, and FHI 900/Fabricolor, other examples are available from H. W. Sands, BASF, Sigma Aldrich, and Gentex |
| Organic, polymer | Nonconjugated polymers (grafted chromophore) | (co)polyarylates with chromophore pendant group, (co)polyacrylamides with chromophore pendant group, vinyl polymers with chromophore pendant group | /Sigma Aldrich |
| | Conjugated quinoid type polymers | Polyisothianaphthene (PITN) | /Sigma Aldrich |
| | Conjugated dye-containing | diketopyrrolo(3,4-c)pyrrole (DPP) polymers | /Sigma Aldrich |
| | Donor-acceptor conjugated | benzo(acceptor)-vinylene(linker)-thiophene (donor) chain | /Sigma Aldrich |

It is to be understood that the polymer particle 9 may be chosen from any polymer particle suitable for 3D printing. The polymer particle 9, in an example, has a particle size ranging from about 1 µm to about 100 µm. In some instances, the upper limit for the polymer particle size is 100 µm. In another example, the polymer particle 9 has a particle size ranging from about 10 µm to about 60 µm. The melting temperature of suitable polymer particles 9 ranges from about 100° C. to about 350° C. The crystallization temperature may be from about 10° C. to about 30° C. below the melting temperature (as determined from DSC measurements).

Some examples of suitable polymers include polyamides, polyacetals, polyolefins, styrene polymers and copolymers, fluoropolymers, acrylic polymers and copolymers, polyethers, polyaryletherketones, polyesters, polycarbonates (PC), etc. In an example, the polymer particle is selected from the group consisting of polyethylene, polyethylene terephthalate (PET), polystyrene (PS), polypropylene, polyoxymethylene (POM), polyether ether ketone (PEEK), polyetherketoneketone (PEKK), polyphenylene sulfide (PPS), polytetrafluoroethylene (PTFE), polyvinylidene fluoride (PVDF), acrylonitrile styrene acrylate (ASA), poly (methyl methacrylate) (PMMA), styrene acrylonitrile (SAN), styrene maleic anhydride (SMA), poly(vinyl chloride) (PVC), polyethylenimine (PEI), and combinations thereof.

In an example, the build material composition 12 is made up of the polymer particle 9 and the radiation absorbing additive particle 11 and/or 11', and no other components. In another example, the build material composition 12 is made up of the polymer particle 9 and the radiation absorbing additive particle 11 and/or 11', as well as charge agent(s) and/or flow aid(s) and/or antioxidant(s).

The build material composition 12 disclosed herein is generally in powder form, and is made up of a plurality of particles 9, 11. The shape of the particles making up the build material composition 12 may be the same or different. In an example, the build material composition 12 particles 9, 11 have spherical or near-spherical shapes. Build material composition 12 particles that have a sphericity of >0.84 are considered herein to be spherical or near-spherical. Thus, any build material composition 12 particles having a sphericity of <0.84 are non-spherical.

In an example, spherical polymer particles 9/additive particles 11, 11' may have a diameter (i.e., particle size) ranging from about 20 µm to about 100 µm, while non-spherical polymer particles 9/additive particles 11, 11 may have an average diameter (i.e., the average of multiple dimensions across the particles 9, 11) ranging from about 20 μm to about 100 μm. For a non-spherical particle 9, 11, the diameter may refer to an effective diameter, which is the diameter of a sphere with the same mass and density as the non-spherical particle 9, 11.

The build material composition 12 may be made up of similarly sized particles 9, 11 (as shown in FIG. 2) (i.e., the size of the particles 9, 11 should not differ by more than about 20 μm to about 40 μm). In an example, the polymer particle 9 and the radiation absorbing additive 11, 11' are selected such that a particle size of each of the polymer particle 9 and the radiation absorbing additive 11, 11' ranges from about 1 μm to about 100 μm.

In a further example, the build material composition 12 includes multi-modal particles 9, 11/11' of two or more different sizes. In an example that includes multi-modal particles, the average size of the polymer particle 9 is larger than the average size of the additive particle 11, 11', and if more particles are included, the average size of the additive particle 11, 11' may be larger than the average size of the additional particle, etc. In a multi-modal system, it is to be understood that the size differential between any two particle types 9, 11/11' is not more than about 20 μm to about 40 μm. The term "size", as used herein with reference to the build material composition 12, refers to the diameter of a spherical particle 9, 11, or the average diameter of a non-spherical particle 9, 11 (i.e., the average of multiple dimensions across the non-spherical particle). As mentioned above, the term "size" when referring to a non-spherical particle 9, 11 of the build material composition 12 may be the effective diameter (i.e., the diameter of a sphere with the same mass and density as the non-spherical particle 9, 11).

The build material composition 12 particles 9, 11 have a density ranging from about 0.4 g/cm$^3$ to about 0.7 g/cm$^3$. The bulk density (as weighed) of most polymers is about 1 g/cm$^3$, where bulk refers to a solid shape without any air pockets. Thus, a density ranging from about 0.4 g/cm$^3$ to about 0.7 g/cm$^3$ generally means that the sample volume contains from about 40% to about 70% of the particles 9, 11, and the rest is in the form of air pockets. After fusing, the density of the fused material may increase, and range from about 0.85 g/cm$^3$ to about 0.95 g/cm$^3$.

As mentioned above, in an example, build material composition 12 may also include (in addition to particles 9, 11) a charging agent, a flow aid, an antioxidant, or combinations thereof.

Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 vol % to less than 5 vol % based upon the total vol % of the build material composition 12 particles.

Flow aid(s) may be added to improve the coating flowability of the build material composition 12. Flow aid(s) may be particularly desirable when the build material composition 12 particles are less than 25 μm in size. The flow aid improves the flowability of the build material composition 12 by reducing the friction, the lateral drag, and the tribo-charge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), titanium dioxide, zinc oxide, or polydimethylsiloxane (E900). In an example, the flow aid is added in an amount ranging from greater than 0 vol % to less than 5 vol % based upon the total vol % of the build material composition 12; or in an amount ranging from greater than 0 vol % to less than 2 vol % based upon the total vol % of the build material composition 12 particles.

A three-dimensional object printing kit includes the build material composition 12; and a fusing agent 26.

Referring now to FIG. 3A, the printing system 10 for forming the 3D object includes a supply bed 16 (including a supply of the build material composition 12), a delivery piston 18, a roller 20, a fabrication bed 22 (having a contact surface 23), and a fabrication piston 24. While not shown, the printing system 10 may also include a central fabrication/build bed and two side supply beds. As an example, a first supply bed may be raised higher than the central fabrication bed, which is raised higher than the second supply bed. In this example, a roller may be moved in a suitable direction to push the build material composition 12 (from the first supply bed) onto the central fabrication bed, where excess build material composition 12 is pushed into the second supply bed (i.e., the supply bed at the lower position). In this example, the positioning of the beds and the process may be reversed.

In the printing system 10, each of the physical elements may be operatively connected to a central processing unit (CPU) of the printing system 10. The central processing unit (e.g., running computer readable instructions stored on a non-transitory, tangible computer readable storage medium) manipulates and transforms data represented as physical (electronic) quantities within the printer's registers and memories in order to control the physical elements to create the 3D object. The data for the selective delivery of the build material composition 12, the fusing agent 26, etc. may be derived from a model of the 3D object to be formed.

The delivery piston 18 and the fabrication piston 24 may be the same type of piston, but are programmed to move in opposite directions. In an example, when a first layer of the 3D object is to be formed, the delivery piston 18 may be programmed to push a predetermined amount of the build material composition 12 out of the opening in the supply bed 16, and the fabrication piston 24 may be programmed to move in the opposite direction of the delivery piston 18 in order to increase the depth of the fabrication bed 22.

The delivery piston 18 will advance enough so that when the roller 20 pushes the build material composition 12 into the fabrication bed 22 and onto the contact surface 23, the depth of the fabrication bed 22 is sufficient so that a layer 14 of the build material composition 12 may be formed in the bed 22. The roller 20 is capable of spreading the build material composition 12 into the fabrication bed 22 to form the layer 14, which is relatively uniform in thickness (as shown at reference number 102 in FIG. 1 and in FIG. 3A). In an example, the thickness of the layer 14 ranges from about 100 μm to about 150 μm, although thinner (e.g., 90

μm) or thicker (e.g., 160 μm) layers may also be used. In another example, the thickness of the layer 14 ranges from about 110 μm to about 150 μm.

As mentioned above, the build material composition 12 includes a plurality of polymer particles 9; and a plurality of radiation absorbing additive particles 11 and/or 11'.

It is to be understood that the roller 20 may be replaced by other tools, such as a blade that may be desirable for spreading different types of powders, or a combination of a roller and a blade. When applying the build material composition 12, a transversal speed of 0.1 inches per second to 100 inches per second may be used.

Figure 3B:
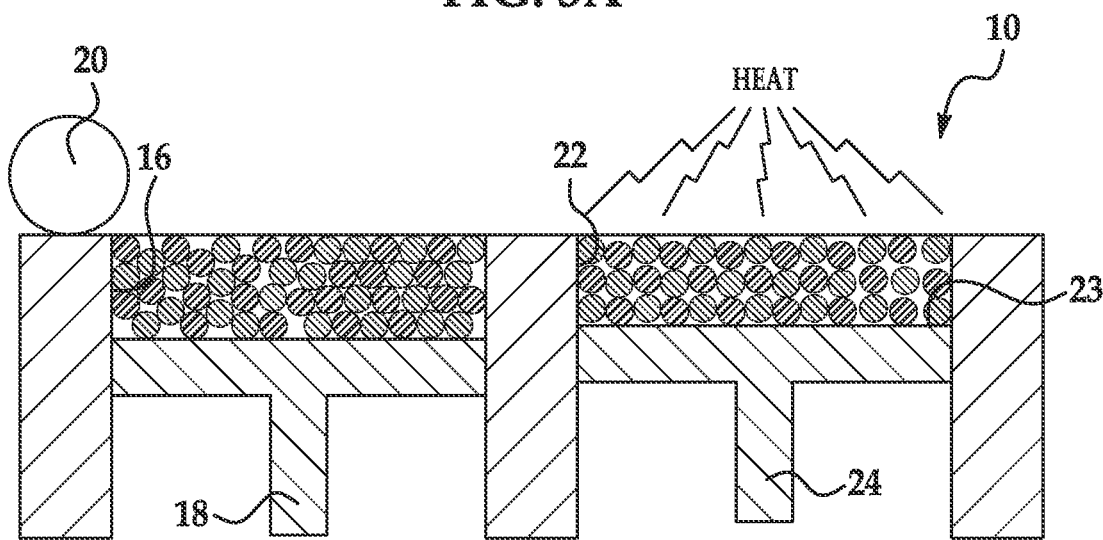

After the layer 14 of the build material composition 12 is introduced into the fabrication bed 22, the layer 14 may be exposed to heating (as shown at reference number 104 in FIG. 1 and in FIG. 3B). Heating, e.g., by exposing to radiation 36 via radiation source 34 (FIG. 3D), is performed to pre-heat (but not melt/fuse) the build material composition 12, and thus it is desirable that the heating temperature be below the melting point of the polymer particle 9 of the build material composition 12. As such, the temperature selected will depend upon the polymer particle 9 that is used. In examples as disclosed herein, the radiation absorbing additive particles 11 and/or 11' may increase radiation absorbance and accelerate the pre-heating of the build material composition 12. As examples, the heating temperature may be from about 5° C. to about 50° C. below the melting point of the build material composition 12. In an example, the heating temperature ranges from about 130° C. to about 180° C. In another example, the heating temperature ranges from about 150° C. to about 160° C.

Pre-heating the layer 14 of the build material composition 12 may be accomplished using any suitable heat source that exposes all of the build material composition 12 in the fabrication bed 22 to the heat. Examples of the heat source include an electromagnetic radiation source, such as a visible/infrared light source, microwave, etc., or a resistive heater(s) that is built into the fabrication and supply beds 22, 16. Pre-heating may be used to ensure that the build material composition 12 is at a uniform temperature, which may help with improving cycle time.

In an example, the pre-heating of the build material composition 12 is up to 10 times faster than pre-heating of a build material composition including the polymer particle 9 but without the radiation absorbing additive 11, 11'. In another example, the pre-heating of the build material composition 12 is at least 4 times faster than pre-heating of a build material composition including the polymer particle 9 but without the radiation absorbing additive 11, 11'. In yet another example, the pre-heating of the build material composition 12 is at least 2 times faster than pre-heating of a build material composition including the polymer particle 9 but without the radiation absorbing additive 11, 11'.

Figure 3C:
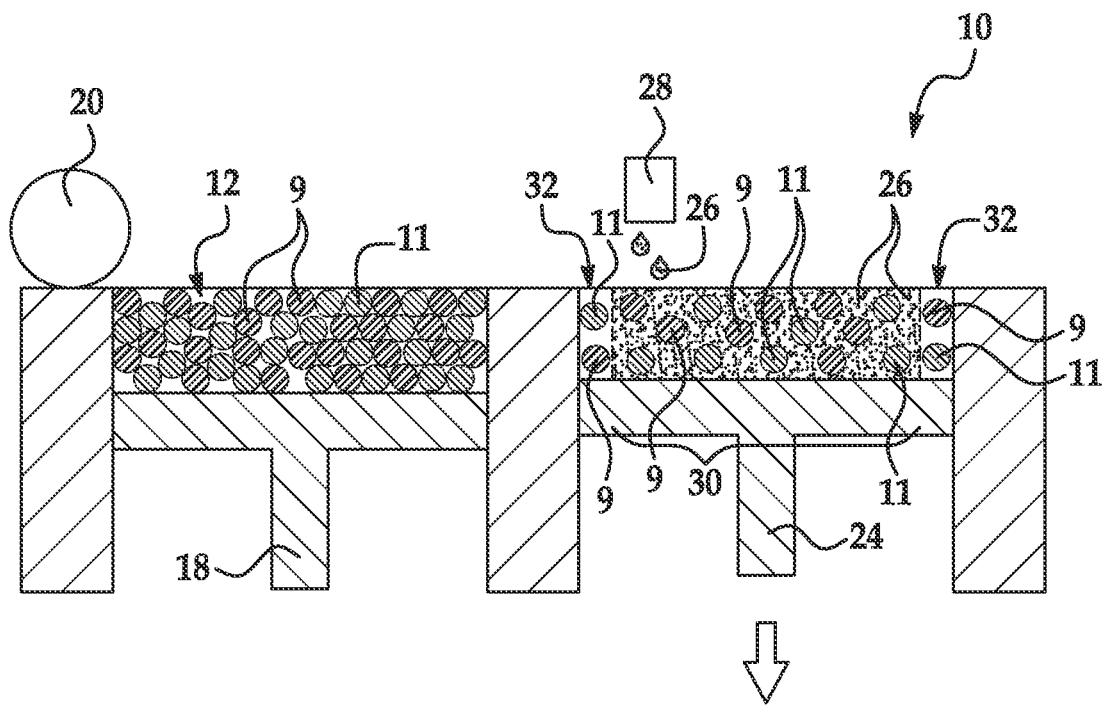

After pre-heating the layer 14, the fusing agent 26 is selectively applied on at least a portion of the build material composition 12 in the layer 14, as shown at reference number 106 in FIG. 1 and in FIG. 3C. The fusing agent 26 (including the active material, discussed further herein) enhances the absorbance of electromagnetic radiation 36, converts the absorbed electromagnetic radiation 36 to thermal energy, and promotes the transfer of the thermal heat to the build material composition 12 in contact with the fusing agent 26 (i.e., in the area(s)/portion(s) 30). In an example, the fusing agent 26 sufficiently elevates the temperature of the build material composition 12 in the area(s)/portion(s) 30 above the melting point(s), allowing curing (e.g., sintering, binding, fusing, etc.) of at least the particles 9 to take place. In some instances, the additive(s) 11, 11' may fuse with the particles 9. In other instances, the additive(s) 11, 11' may become trapped into the lattice of the polymer particles 9 that are fused/melted together. In still other instances, the additive(s) 11, 11' may decompose at the elevated temperatures used for fusing, and thus may not be present in the final 3d object.

Figure 4:
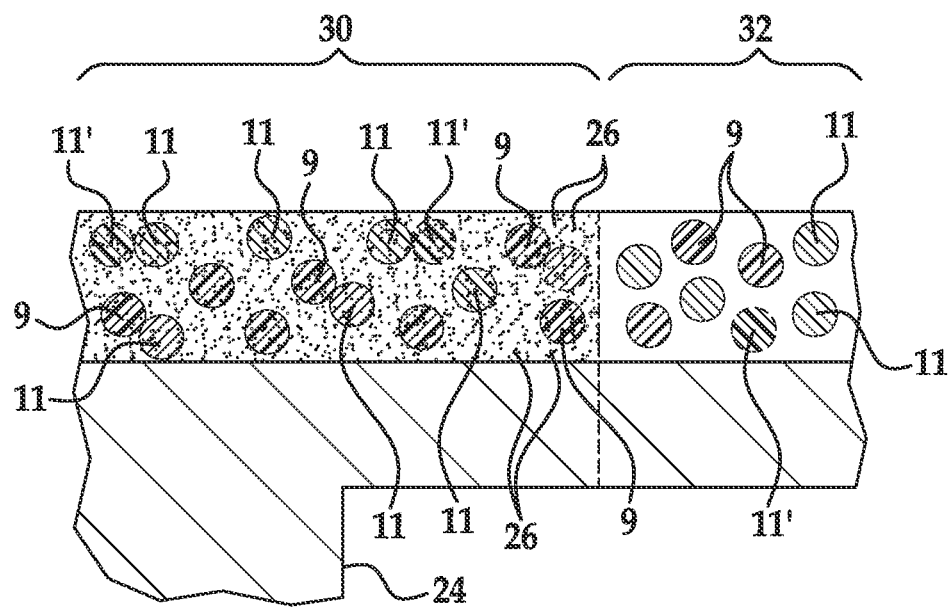
FIG. 4 is an enlarged, semi-schematic, cut-away cross-sectional view of a portion of FIG. 3C.

FIG. 4 is a semi-schematic, cut-away cross-sectional view of a portion of FIG. 3C. It is to be understood that this cross-section is perpendicular to the contact surface 23 and is not the same as the cross-section of the pattern of the layer. The view in FIG. 4 illustrates some of the build material composition 12 on the contact surface 23 after the fusing agent 26 is applied thereon. As depicted, the fusing agent 26 penetrates into at least some of the voids between the particles 9, 11, 11' of the build material composition 12 within the portion 30. The fusing agent 26 is capable of enhancing curing (fusing, sintering, etc.) of the portion 30 of the build material composition 12. In the area 32, the particles 9, 11, 11' have not had fusing agent 26 applied thereto.

As illustrated in FIG. 3C, the fusing agent 26 may be dispensed from an inkjet applicator 28 (e.g., a thermal inkjet printhead or a piezoelectric inkjet printhead). While a single inkjet applicator 28 is shown in FIG. 3C, it is to be understood that multiple inkjet applicators may be used that span the width of the fabrication bed 22. The inkjet applicator(s) 28 may be attached to a moving XY stage or a translational carriage (neither of which is shown) that moves the inkjet applicator(s) 28 adjacent to the fabrication bed 22 in order to deposit the fusing agent 26 in desirable area(s).

The inkjet applicator(s) 28 may be programmed to receive commands from the central processing unit and to deposit the fusing agent 26 according to a pattern of a cross-section for the layer of the 3D object that is to be formed. As used herein, the cross-section of the layer of the 3D object to be formed refers to the cross-section that is parallel to the contact surface 23. The inkjet applicator(s) 28 selectively applies the fusing agent 26 on those portions of the layer 14 that are to be fused to become one layer of the 3D object. As an example, if the first layer is to be shaped like a cube or cylinder, fusing agent 26 will be deposited in a square pattern or a circular pattern (from a top view), respectively, on at least a portion of the layer 14 of the build material composition 12. In the example shown in FIG. 3C, the fusing agent 26 is deposited in a square pattern on the area or portion 30 of the layer 14, and not on the areas or portions 32.

The fusing agent 26 used in the examples disclosed herein is aqueous based. The aqueous nature and particular components of the fusing agent 26 enhance the wetting properties of the fusing agent 26, even on the build material composition 12, which may be hydrophobic in some examples. This enables the fusing agent 26 to be printed more uniformly over the build material composition 12 surface.

Examples of suitable fusing agents are water-based dispersions including a radiation absorbing binding agent (i.e., an active material). The active material may be any infrared light absorbing colorant. In an example, the active material is a near infrared light absorber dye or pigment. Any near infrared colorants produced by Fabricolor, Eastman Kodak, or Yamamoto may be used in the fusing agent 26. As one example, the fusing agent 26 may be an ink-type formulation including carbon black as the active material. Examples of this ink-type formulation are commercially known as CM997A, 516458, C18928, C93848, C93808, or the like, all of which are available from Hewlett-Packard Company. Examples of other pigment based inks include the commercially available inks CM993A and CE042A, available from Hewlett-Packard Company.

The amount of the active material (e.g., carbon black pigment) that is present in the fusing agent 26 may range from about 2.0 wt % to about 6.0 wt % based on the total wt % of the fusing agent 26. In other examples, the amount of the active material present in fusing agent 26 ranges from greater than 3.0 wt % up to about 5.0 wt %. It is believed that these active material/pigment loadings provide a balance between the fusing agent 26 having jetting reliability and electromagnetic radiation absorbance efficiency. When the active material/carbon black pigment is present in an ink-type formulation, the amount of the ink-type formulation that is added to the fusing agent 26 may be selected so that the amount of the active material in the fusing agent 26 is within the given ranges.

While a single fusing agent 26 fluid is shown in FIG. 3C, it is to be understood that a plurality of fluids may be used. For example, different fluids with different functions may be used. As an example, a fusing agent 26 may be used to provide color, another fusing agent 26 may be used to, in some instances, provide a catalyst, and yet another fusing agent 26 may be used to incorporate a binder for fusing enhancement.

In some examples, the inkjet printhead(s)/applicator(s) 28 are capable of separately dispensing CMYKW (cyan, magenta, yellow, black, and white) inks. A printhead/applicator 28 may also include a colorless ink.

The fusing agent 26 may also include additional components. For example, the fusing agent 26 may include a surfactant, a co-solvent, a biocide, a humectant, an anti-kogation agent, or combinations thereof.

Surfactant(s) may be used to improve the wetting properties of the fusing agent 26. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the fusing agent 26 may range from about 0.2 wt % to about 1.5 wt % based on the total wt % of the fusing agent 26. In another example, the total amount of surfactant(s) ranges from about 0.5 wt % to about 1.4 wt %.

The type and amount of surfactant may be selected so that a contact angle with a contact line of the build material composition 12 is less than 90°. In some instances, the contact angle may be less than 45°, which may be desirable to ensure wetting of the build material composition 12 with the fusing agent 26.

A co-solvent may be included in the fusing agent 26 to speed evaporation of the fusing agent 26 after application to the build material composition 12. Some examples of the co-solvent include 1-(2-hydroxyethyl)-2-pyrrolidinone, 2-Pyrrolidinone, 1,5-Pentanediol, Triethylene glycol, Tetraethylene glycol, 2-methyl-1,3-propanediol, 1,6-Hexanediol, Tripropylene glycol methyl ether, N-methylpyrrolidone, Ethoxylated Glycerol-1 (LEG-1), and combinations thereof. In an example, 2-Pyrrolidinone is selected as the co-solvent.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.). The biocide or antimicrobial may be added in any amount ranging from about 0.05 wt % to about 0.5 wt % with respect to the total wt % of the fusing agent 26.

When included in the fusing agent 26, the humectant is present in an amount ranging from about 0.1 wt % to about 15 wt %. Examples of suitable humectants include Di-(2-hydroxyethyl)-5,5-dimethylhydantoin (e.g., DANTOCOL® DHF from Lonza, Inc.), propylene glycol, hexylene glycol, butylene glycol, glyceryl triacetate, vinyl alcohol, neoagarobiose, glycerol, sorbitol, xylitol, maltitol, polydextrose, *quillaia*, glycerin, 2-methyl-1,3-propanediol, and combinations thereof.

An anti-kogation agent may be included in the fusing agent 26. Kogation refers to the deposit of dried ink (e.g., fusing agent 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the fusing agent 26 may range from greater than 0.20 wt % to about 0.62 wt % based on the total wt % of the fusing agent 26. In an example, the oleth-3-phosphate is included in an amount ranging from about 0.20 wt % to about 0.60 wt %, and the low molecular weight polyacrylic acid polymer is included in an amount ranging from about 0.005 wt % to about 0.015 wt %.

The balance of the fusing agent 26 is water. In an example, the amount of water ranges from about 70 wt % to about 95 wt % of the total weight of the fusing agent 26.

The fusing agent 26 may be a colored (e.g., CMYK) inkjet ink, or a colorless (without any dye/pigment) inkjet ink. Table 2 provides some examples of a colored fusing agent 26.

TABLE 2

Example Colored Fusing Agents

|  | Black (K) (wt %) | Cyan (wt %) | Magenta (wt %) | Yellow (wt %) |
|---|---|---|---|---|
| Colorant/Active Material |  |  |  |  |
| K pigment dispersion from DIC Corp. | 3.5 |  |  |  |
| Cyan pigment dispersion from DIC Corp. |  | 4.0 |  |  |

TABLE 2-continued

Example Colored Fusing Agents

|  | Black (K) (wt %) | Cyan (wt %) | Magenta (wt %) | Yellow (wt %) |
|---|---|---|---|---|
| Magenta pigment dispersion from DIC Corp. |  |  | 4.0 |  |
| Yellow pigment dispersion from DIC Corp. |  |  |  | 4.0 |
| Vehicle |  |  |  |  |
| Co-solvents |  |  |  |  |
| 2-Pyrrolidinone | 15.00 | 15.00 | 15.00 | 15.00 |
| 1-(2-Hydroxyethyl)-2-pyrrolidone | 5.00 | 5.00 | 5.00 | 5.00 |
| Surfactants |  |  |  |  |
| Surfynol ® SEF | 0.85 | 0.65 | 0.65 | 0.65 |
| Additives |  |  |  |  |
| Crodafos ® O3A | 0.50 | 1.00 | 0.75 | 0.75 |
| Biocide |  |  |  |  |
| Proxel GXL (as is) | 0.18 | 0.18 | 0.18 | 0.18 |
| Kordek MLX | 0.14 | 0.14 | 0.14 | 0.14 |
| Water | balance | balance | balance | balance |
| pH (adjusted with KOH) | 9.2 to 9.4 | 9.2 to 9.4 | 9.2 to 9.4 | 9.2 to 9.4 |

Figure 3D:
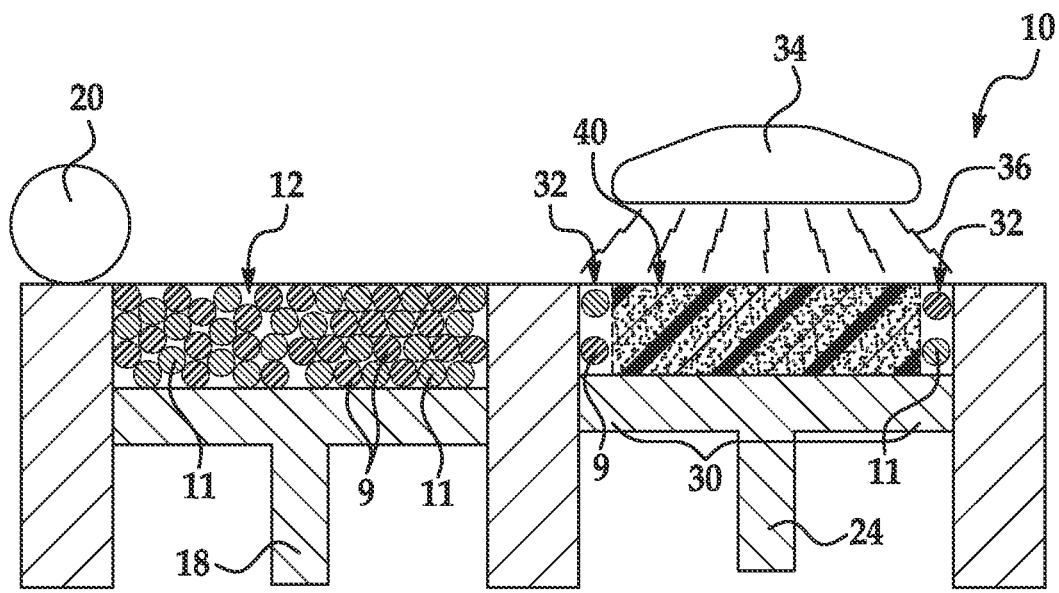

As briefly mentioned above, after the fusing agent 26 is selectively applied in the desired area(s) or portion(s) 30, the layer 14 (e.g., the entire layer 14) of the build material composition 12 and the fusing agent 26 applied to at least a portion thereof is exposed to electromagnetic radiation 36, whereby the at least the portion (i.e., in area/portion 30) of the build material composition 12 in contact with the fusing agent 26 at least partially fuses (as shown at reference numeral 108 in FIG. 1). This is shown in FIG. 3D. It is to be understood that, in an example, the electromagnetic radiation 36 may be continuously applied from the preheating (FIG. 3B), through the application of the fusing agent 26 (FIG. 3C), and during the exposure (FIG. 3D).

In addition to using an applied radiation source 34, the fabrication bed 22 (FIG. 3 series)/support member 60 (FIG. 6) may be heated (if further heating is desired). An example of multiple radiation and/or heating sources includes a stationary overhead IR-vis lamp, resistive heaters in the supply and fabrication beds 16, 22, and a moving/travelling vis-IR lamp that can pass over the fabrication bed 22. An example of a single radiation source 34 is a travelling lamp (i.e., without any stationary lamps) that repeatedly moves over the fabrication bed 22 to expose the build material composition 12 to radiation 36 and heat.

Further, it is to be understood that portions 32 of the build material composition 12 that do not have the fusing agent 26 applied thereto absorb little, of the applied radiation 36. For example, the build material composition 12 may absorb from about 8% to about 10% of the applied radiation 36. As such, the build material particles 9, 11/11' within the portion(s) 32 generally do not exceed the melting point(s) of the build material particles 9, 11/11' and do not fuse/cure.

In an example, the electromagnetic radiation 36 may range from UV-Vis to infrared, including, e.g., mid-infrared and near-infrared radiation. The electromagnetic radiation 36 is emitted from a radiation source 34, such as an IR or near-IR curing lamp, halogen lamps emitting in the visible and near-IR range, IR or near-IR light emitting diodes (LED), a microwave, or lasers with the desirable electromagnetic wavelengths. In an example, the light source electromagnetic wavelengths range from about 100 nm (UV) to about 10 μm. In another example, the light source is a near-infrared light source with wavelengths of about 800 nm. In yet another example, the radiation source 34 is an infrared light source with wavelengths of about 2 μm. The radiation source 34 may be attached, for example, to a carriage that also holds the inkjet applicator(s) 28. The carriage may move the radiation source 34 into a position that is adjacent to the fabrication bed 22. The radiation source 34 may be programmed to receive commands from the central processing unit and to expose the layer 14 and applied fusing agent 26 to electromagnetic energy 36.

The length of time the radiation 36 is applied for, or the energy exposure time, may be dependent, for example, on one or more of: characteristics of the radiation source 34; characteristics of the build material composition 12; and/or characteristics of the fusing agent 26.

The fusing from the exposure to radiation 36 forms one layer 40 of the 3D object 50 (FIGS. 3E and 5) to be formed.

If it is desired to form subsequent layers of the 3D object 50, a layer of the build material composition 12 may be applied on the layer 40 of the three-dimensional object 50 (as shown at reference numeral 110 in FIG. 1). The layer of the build material composition 12 may be exposed to radiation 36 to pre-heat (as shown at reference number 112 in FIG. 1 and in FIG. 3B). After pre-heating the layer of the build material composition 12, the fusing agent 26 is selectively applied on at least a portion of the layer of the build material composition 12, as shown at reference number 114 in FIG. 1 and in FIG. 3C. After the fusing agent 26 is selectively applied in the desired area(s) or portion(s) 30, the build material composition 12 layer (e.g., the entire build material composition 12 layer) and the fusing agent 26 applied to at least a portion thereof is exposed to electromagnetic radiation 36, whereby at least the polymer particle 9 within the at least the portion (i.e., in area/portion 30) of the layer of the build material composition 12 in contact with the fusing agent 26 at least partially fuses (as shown at reference numeral 116 in FIG. 1 and in FIG. 3D). The fusing from the exposure to radiation 36 forms a second layer 42 of the 3D object 50 (FIGS. 3E and 5) to be formed.

It is to be understood that reference numerals 110 through 116 of FIG. 1 may be repeated as many times as desirable to create subsequent layers 42, 44, 46 (FIGS. 3E and 5) and to ultimately form the 3D object 50. It is to be understood that heat absorbed during the application of energy from the portion 30 of the build material composition 12 on which fusing agent 26 has been delivered or has penetrated may propagate to a previously solidified layer, such as layer 40, causing at least some of that layer to heat up above its melting point. This effect helps create strong interlayer bonding between adjacent layers of the 3D object 50.

It is to be understood that the subsequently formed layers 42, 44, 46 may have any desirable shape and/or thickness and may be the same as, or different from any other layer 40, 42, 44, 46, depending upon the size, shape, etc. of the 3D object 50 that is to be formed.

Figure 3E:
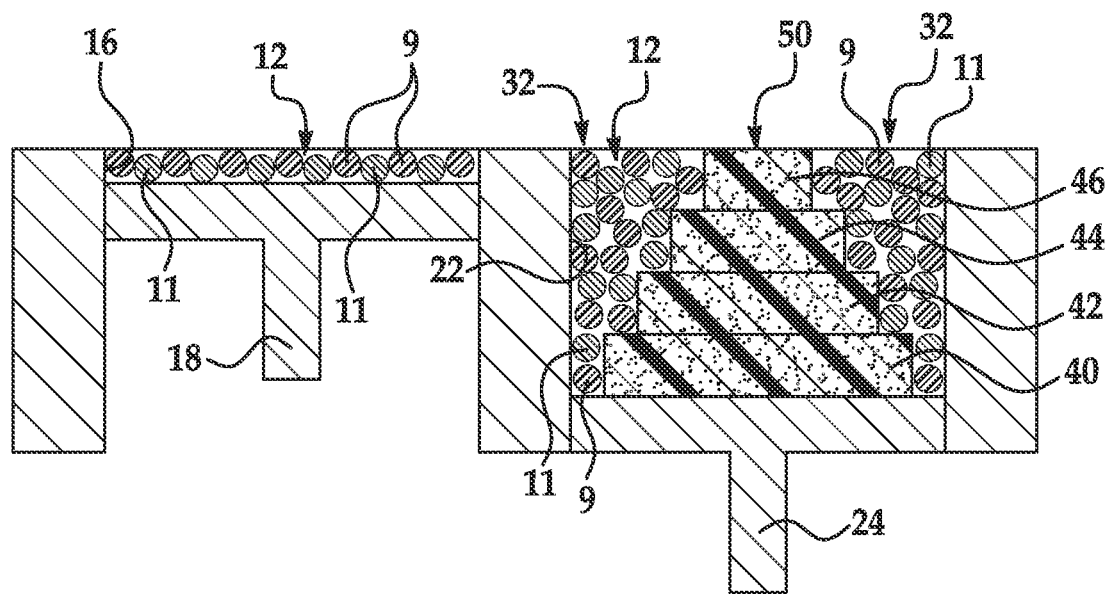
FIG. 3E is a semi-schematic, cross-sectional view of an example of the 3D object that may be formed after performing FIGS. 3A through 3D several times.

As illustrated in FIG. 3E, as subsequent layers 42, 44, 46 have been formed, the delivery piston 18 is pushed closer to the opening of the delivery bed 16, and the supply of the build material composition 12 in the delivery bed 16 is diminished (compared, for example, to FIG. 3A at the outset of the method 100). The fabrication piston 24 is pushed further away from the opening of the fabrication bed 22 in order to accommodate the subsequent layer(s) of build material composition 12 and selectively applied fusing agent 26. Since at least some of the build material composition 12 remains unfused after each layer 40, 42, 44, 46 is formed, the 3D object 50 in the fabrication bed 22 is at least partially surrounded by the non-fused build material composition 12.

When the 3D object 50 is formed, it may be removed from the fabrication bed 22, and exposed to a cleaning process that removes non-fused build material composition 12 from the 3D object 50. Some examples of the cleaning process include brushing, water-jet cleaning, sonic cleaning, blasting, and combinations thereof. The non-fused build material composition 12 remaining in the fabrication bed 22 may be reused depending, in part, on process conditions.

Figure 5:
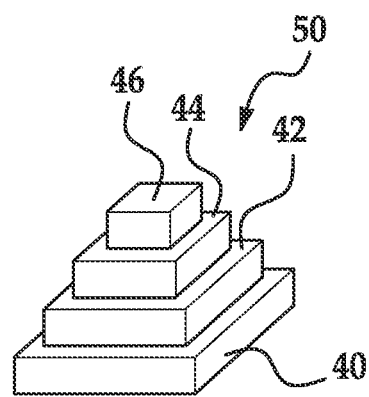
FIG. 5 is a perspective view of the 3D object of FIG. 3E.

FIG. 5 illustrates a perspective view of the 3D object 50. Each of the layers 40, 42, 44, 46 includes fused 9 and 11 and/or 11'.

Figure 6:
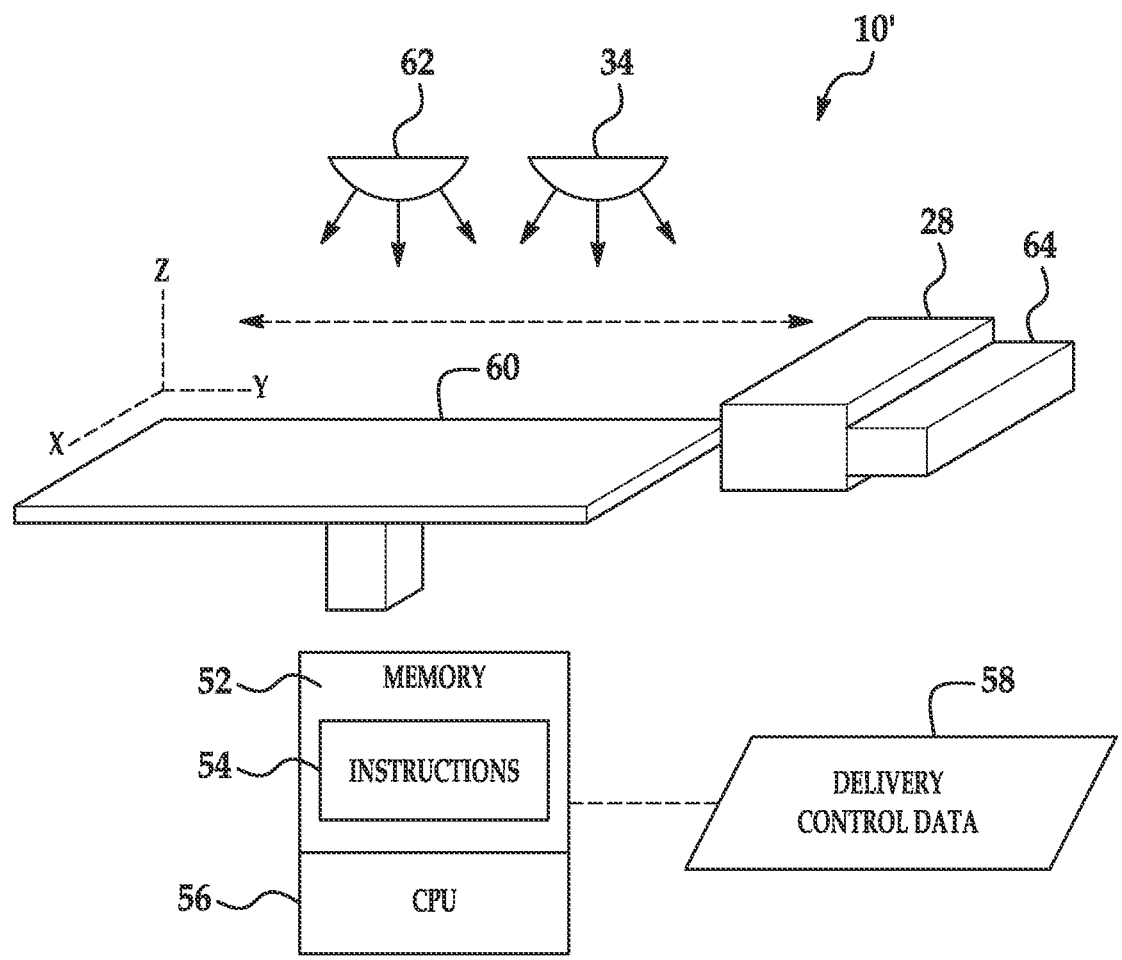
FIG. 6 is a simplified isometric view of an example of a 3D printing system that may be used in an example of the 3D printing method disclosed herein.

Referring now to FIG. 6, another example of the printing system 10' is depicted. The system 10' includes a central processing unit (CPU) 56 that controls the general operation of the additive printing system 10'. As an example, the central processing unit 56 may be a microprocessor-based controller that is coupled to a memory 52, for example via a communications bus (not shown). The memory 52 stores the computer readable instructions 54. The central processing unit 56 may execute the instructions 54, and thus may control operation of the system 10' in accordance with the instructions 54.

In this example, the printing system 10' includes the inkjet applicator 28 to selectively deliver/apply the fusing agent 26 to a layer 14 (not shown in this figure) of build material composition 12 provided on a support member 60. In an example, the support member 60 has dimensions ranging from about 10 cm by 10 cm up to about 100 cm by 100 cm, although the support member 60 may have larger or smaller dimensions depending upon the 3D object 50 that is to be formed.

The central processing unit 56 controls the selective delivery of the fusing agent 26 to the layer 14 of the build material composition 12 in accordance with delivery control data 58.

In the example shown in FIG. 6, it is to be understood that the inkjet applicator 28 is a printhead, such as a thermal printhead or a piezoelectric inkjet printhead. The inkjet applicator 28 may be a drop-on-demand printhead or a continuous drop printhead.

The inkjet applicator 28 may be used to selectively deliver the fusing agent 26. As described above, the fusing agent 26 includes an aqueous vehicle (such as water), and, in some instances, other suitable components, such as a co-solvent, a surfactant, etc., to facilitate its delivery via the inkjet applicator 28.

In one example, the inkjet applicator 28 may be selected to deliver drops of the fusing agent 26 at a resolution ranging from about 300 dots per inch (DPI) to about 1200 DPI. In other examples, the inkjet applicator 28 may be selected to be able to deliver drops of the fusing agent 26 at a higher or lower resolution.

The inkjet applicator 28 may include an array of nozzles through which the inkjet applicator 28 is able to selectively eject drops of fluid. In one example, each drop may be in the order of about 10 pico liters (pl) per drop, although it is contemplated that a higher or lower drop size may be used. In some examples, inkjet applicator 28 is able to deliver variable size drops.

The inkjet applicator 28 may be an integral part of the printing system 10', or it may be user replaceable. When the inkjet applicator 28 is user replaceable, it may be removed from and inserted into a suitable distributor receiver or interface module (not shown).

In another example of the printing system 10', a single inkjet printhead may be used to selectively deliver different fusing agent fluids 26. For example, a first set of printhead nozzles of the printhead may be configured to deliver one of the fluids 26, and a second set of printhead nozzles of the printhead may be configured to deliver another of the fluids 26.

As shown in FIG. 6, the inkjet applicator 28 has a length that enables it to span the whole width of the support member 60 in a page-wide array configuration. In an example, the page-wide array configuration is achieved through a suitable arrangement of multiple inkjet applicators 28. In another example, the page-wide array configuration is achieved through a single inkjet applicator 28 with an array of nozzles having a length to enable them to span the width of the support member 60. In other examples of the printing system 10', the inkjet applicator 28 may have a shorter length that does not enable them to span the whole width of the support member 60.

While not shown in FIG. 6, it is to be understood that the inkjet applicator 28 may be mounted on a moveable carriage to enable it to move bi-directionally across the length of the support member 60 along the illustrated Y-axis. This enables selective delivery of the fusing agent 26 across the whole width and length of the support member 60 in a single pass. In other examples, the inkjet applicator 28 may be fixed while the support member 60 is configured to move relative thereto.

As used herein, the term 'width' generally denotes the shortest dimension in the plane parallel to the X and Y axes shown in FIG. 6, and the term 'length' denotes the longest dimension in this plane. However, it is to be understood that in other examples the term 'width' may be interchangeable with the term 'length'. As an example, the inkjet applicator 28 may have a length that enables it to span the whole length of the support member 60 while the moveable carriage may move bi-directionally across the width of the support member 60.

In examples in which the inkjet applicator 28 has a shorter length that does not enable them to span the whole width of the support member 60, the inkjet applicator 28 may also be movable bi-directionally across the width of the support member 60 in the illustrated X axis. This configuration enables selective delivery of the fusing agent 26 across the whole width and length of the support member 60 using multiple passes.

The inkjet applicator 28 may include therein a supply of the fusing agent 26, or may be operatively connected to a separate supply of the fusing agent 26.

As shown in FIG. 6, the printing system 10' also includes a build material distributor 64. This distributor 64 is used to provide the layer (e.g., layer 14) of the build material composition 12 on the support member 60. Suitable build material distributors 64 may include, for example, a wiper blade, a roller, or combinations thereof.

The build material composition 12 may be supplied to the build material distributor 64 from a hopper or other suitable delivery system. In the example shown, the build material distributor 64 moves across the length (Y axis) of the support member 60 to deposit a layer of the build material composition 12. As previously described, a first layer of build material composition 12 will be deposited on the support member 60, whereas subsequent layers of the build material composition 12 will be deposited on a previously deposited (and solidified) layer.

It is to be further understood that the support member 60 may also be moveable along the Z axis. In an example, the support member 60 is moved in the Z direction such that as new layers of build material composition 12 are deposited, a predetermined gap is maintained between the surface of the most recently formed layer and the lower surface of the inkjet applicator 28. In other examples, however, the support member 60 may be fixed along the Z axis, and the inkjet applicator 28 may be movable along the Z axis.

Similar to the system 10, the system 10' also includes the radiation source 34 to apply energy when desired to the deposited layer of build material composition 12 and the selectively applied fusing agent 26. Any of the previously described radiation sources 34 may be used. In an example, the radiation source 34 is a single energy source that is able to uniformly apply energy to the applied materials, and in another example, radiation source 34 includes an array of energy sources to uniformly apply energy to the deposited materials.

In the examples disclosed herein, the radiation source 34 may be configured to apply energy in a substantially uniform manner to the whole surface of the deposited build material composition 12. This type of radiation source 34 may be referred to as an unfocused energy source. Exposing the entire layer to energy simultaneously may help increase the speed at which a three-dimensional object 50 may be generated.

While not shown, it is to be understood that the radiation source 34 may be mounted on the moveable carriage or may be in a fixed position.

The central processing unit 56 may control the radiation source 34. The amount of energy applied may be in accordance with delivery control data 58.

The system 10' may also include a pre-heater 62 that may be used to pre-heat the support member 60 and/or the deposited build material composition 12 (as described above). Still further, the system 10' may include tools and components to perform the cleaning previously described.

To further illustrate the present disclosure, examples are given herein. It is to be understood that these examples are provided for illustrative purposes and are not to be construed as limiting the scope of the present disclosure.

EXAMPLES

Example 1

A build material composition was formed from nylon 12 (polyamide 12) polymer particles (melting temperature about 190° C.) and some examples of additive particles, as shown in Table 3 below. The similarity of particle size between the nylon 12 powder and the additive powders allowed the powders to be easily blended together.

TABLE 3

| ID | Additive | Type | Vol % of additive (of total build material comp) | Additive particle size (μm) | Vol % of polymer (of total build material comp) | Polymer particle size (μm) | Increase of absorbed energy (during preheating) as compared to polymer without additive |
|---|---|---|---|---|---|---|---|
| 7-1 | Metal hydroxide phosphate (Cu$_2$(OH)PO$_4$) | Inorganic, stable | 0.5 | 10 to 60 microns | 99.5 | 10 to 60 microns | 1.7 X |
| 7-1 | Metal hydroxide phosphate (Cu$_2$(OH)PO$_4$) | Inorganic, stable | 1 | 10 to 60 microns | 99 | 10 to 60 microns | 2.4 X |
| 8-1 | Minatec ® 230 A-IR | Inorganic, stable | 1 | 10 to 60 microns | 99 | 10 to 60 microns | 2.2 X |
| 8-2 | SbSnO$_2$ | Inorganic, stable | 1 | 5 to 50 microns | 99 | 10 to 60 microns | 2.5 X |
| 11-1 | Phthalocyanine | Organic, may decompose | 0.02 | molecular | 99.98 | 10 to 60 microns | 3.1 X |
| 11-1 | Phthalocyanine | Organic, may decompose | 0.1 | molecular | 99.9 | 10 to 60 microns | 4.4 X |

Respective areas of a fabrication bed (i.e., powder-bed) were covered with the nylon 12 (without any additive) and with the different build material compositions shown in Table 3. This example did not involve the printing of a fusing agent, as this test was performed to demonstrate the effect that the additive had on the heating of the powder, as compared to the heating of the powder without the additive. Heating in this example was accomplished using stationary overhead lamps. Overall, the areas with the combination of the nylon 12 powder and the additive heated much faster (and the material's surface melted), while the areas covered with nylon 12 powder without any additive never got hot enough to melt.

The increase of absorbed energy for the nylon 12 powder with the respective additives was obtained by measuring spectral transmission and reflectivity of the powder mixture, and the portion of energy absorbed by the powder mixture was calculated using the emission spectrum of the printer heating lamps. It was assumed that the lamp illuminating the powder was a blackbody (different lamp power corresponding to different blackbody temperatures were considered), and for calculation purposes, the blackbody was assumed to be a 2500K blackbody. The calculation used was 1=absorption+transmission+reflection. The results were normalized to energy absorbed by nylon 12 powder alone (with no additive), and are also shown in Table 3. In each instance of the build material composition formed with an additive, there was an increase in absorbed energy.

The phthalocyanine additive decomposes when exposed to ambient air at a printing temperature of about 170° C. Decomposition may cause a darker powder (which may in some instances not be desirable), or it may, in some instances, be desirable for the additive to not be present in the final printed object. This phenomenon does not occur when phthalocyanine is used in conjunction with a polymer having a lower melting point.

All tested additives from Table 3 were compatible with the nylon 12 powder used as the test vehicle—mixtures of nylon 12 powder plus respective additive retained the rheological properties of the original nylon 12 powder alone.

Figure 7A:
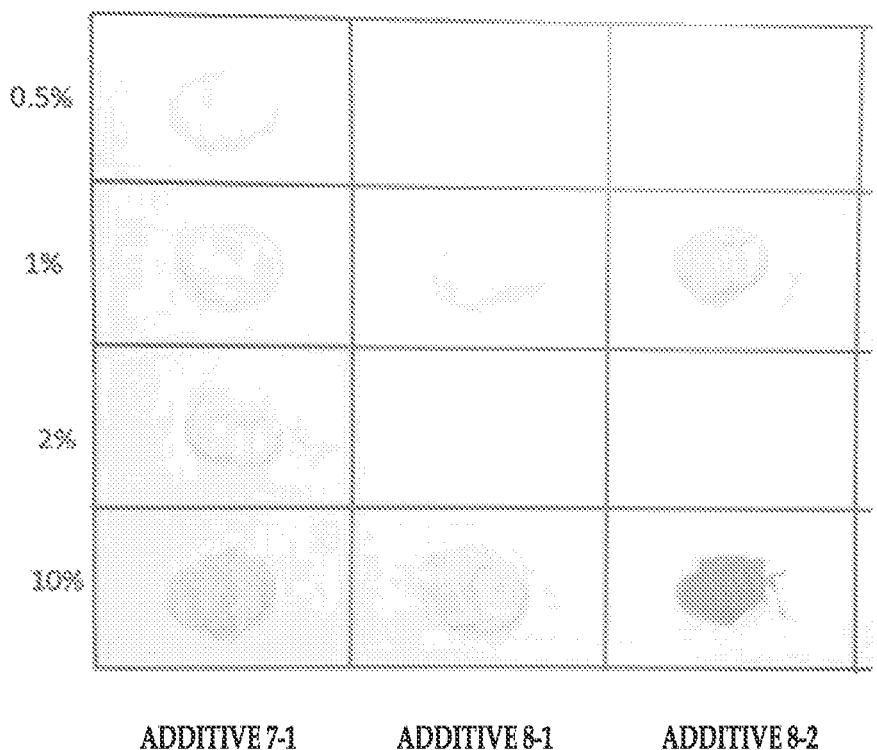
FIGS. 7A and 7B are black and white representations of originally colored photographs showing the variation between nylon 12 powder-additive mixtures as a function of additive concentration.
Figure 7B:
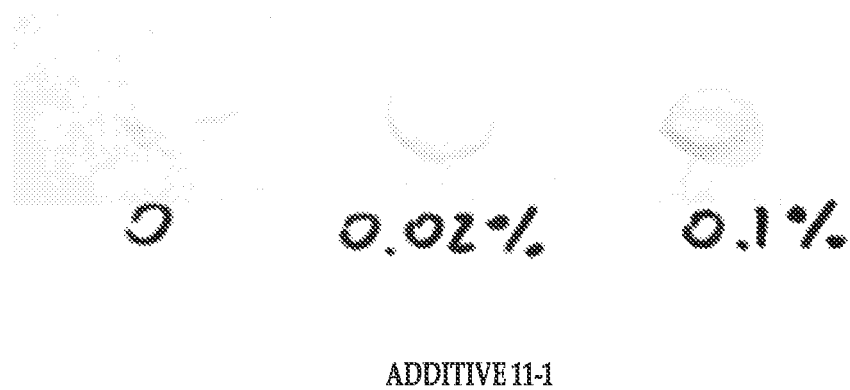

FIGS. 7A and 7B are black and white representations of originally colored photographs that showed the color of the nylon 12 powder-additive mixtures as a function of selected additive concentration (in vol %). The powders were originally photographed on a white paper. "0" (in FIG. 7B) is nylon 12 powder alone (with no additive). This powder was white with a very slight yellow hue, and almost blended in with the white paper. This is also evident in the black and white presentation of "0" in FIG. 7B. The color change in the resulting build material composition in most cases was insignificant at the tested additive concentrations (vol % additive shown in Table 3 above) and acceptable for 3D printing applications. For additives 7-1 and 8-1, the yellow hue increased as more additive was added, but the increase as less with additive 8-1. For additive 8-2, the color went from the white with very slight yellow hue ("0") to white with a slight grey hue when 1% of the additive was added and to grey when 10% of the additive was added. The color changes are evident even in the grey scale of FIG. 7A. For additive 11-1, the yellow hue increased as the amount of additive increased, as evidenced by the darker imaged going from left to right in FIG. 7B. The color change in the resulting build material composition also appeared insignificant at additive concentrations of 2 vol % and acceptable for 3D printing applications. However, as can be seen in FIG. 7A, the color change in the resulting build material composition at additive concentrations of 10 vol % was more significant and may not be acceptable in some instances.

There was substantially no degradation of the mechanical properties of 3D printed parts when the additive concentration was kept at about, or below 2 vol % (with respect to a total vol % of the build material composition powder). For example, the mechanical strength of nylon 12 with no additive is 47 MPa, and the extension at break is 74%. The mechanical strength of the mixture of nylon 12 with 1 vol % of additive 8-1 (Table 3) is 48 MPa, and the extension at break is 71%. As the concentration of the additive is increased, further gradual degradation of the mechanical properties may occur. It is believed that at additive concentrations at or below 4 vol %, the degradation of the mechanical properties may be within an acceptable level.

All tested additives in Table 3 are commercially available. The cost, e.g., of the inorganic additives, is a negligible part of the build material composition powder cost.

Example 2

A build material composition was formed from polyether ether ketone (PEEK) polymer articles (melting temperature about 343° C.) and some examples of additive particles, as shown in Table 4 below. The similarity of particle size between the PEEK powder and the additive powders allowed the powders to be easily blended together.

TABLE 4

| ID | Additive | Type | Vol % of additive (of total build material comp) | Additive particle size (μm) | Vol % of polymer (of total build material comp) | Polymer particle size (μm) |
|---|---|---|---|---|---|---|
| 1 | Minatec ® 230 A-IR | Inorganic, stable | 3 | 10 to 60 microns | 97 | 10 to 60 microns |
| 2 | $SbSnO_2$ | Inorganic, stable | 3 | 5 to 50 microns | 97 | 10 to 60 microns |

Figure 8:
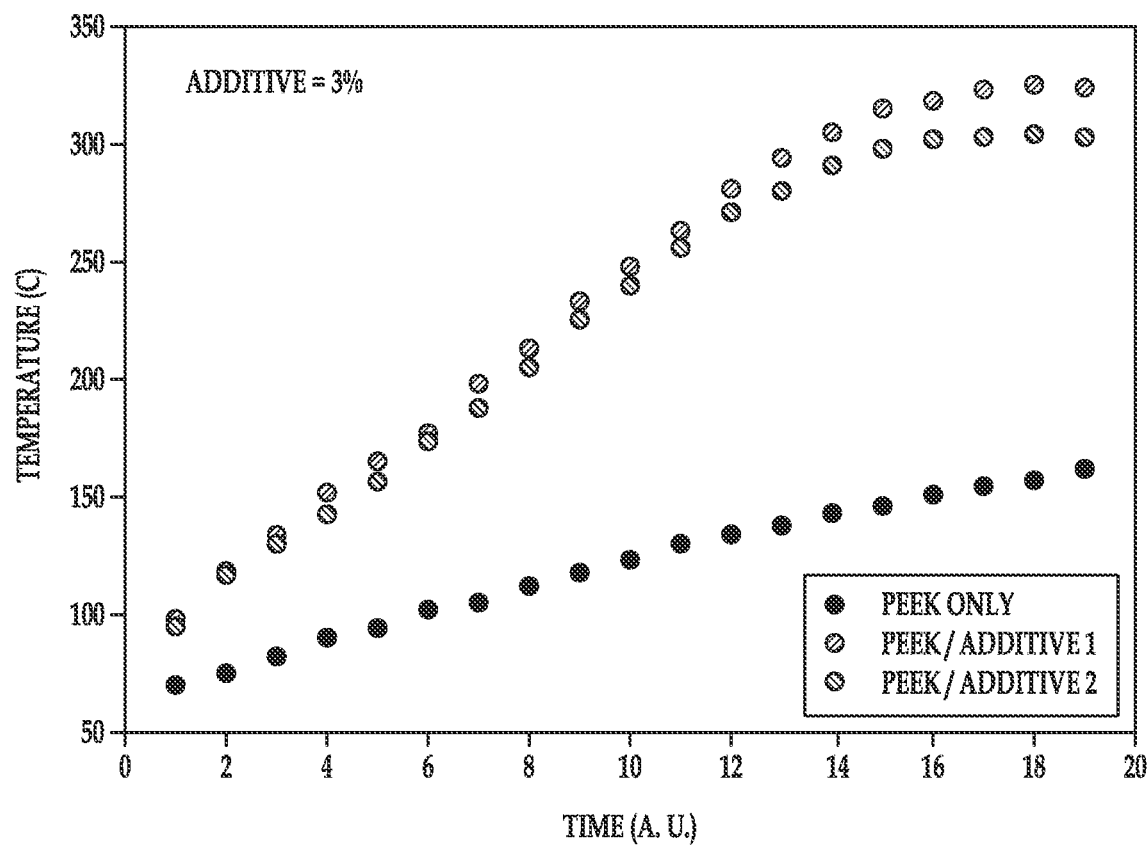
FIG. 8 is a graph depicting temperature changes over time (in arbitrary units, a.u.) of a sample of polyether ether ketone (PEEK) with two different example additives and without an example additive.

Respective areas of a fabrication bed (i.e., powder-bed) were covered with the PEEK (without any additive) and with the different build material compositions shown in Table 4. This example did not involve the printing of a fusing agent, as this test was performed to demonstrate the effect that the additive had on the heating of the powder, as compared to the heating of the powder without the additive. Heating in this example was accomplished using stationary overhead lamps. The heating results are shown in FIG. 8. As depicted, the areas with the combination of the PEEK powder and the respective additives heated much faster (and was close to or at the melting temperature), while the area covered with PEEK powder without any additive never got hot enough to melt.

Figure 9:
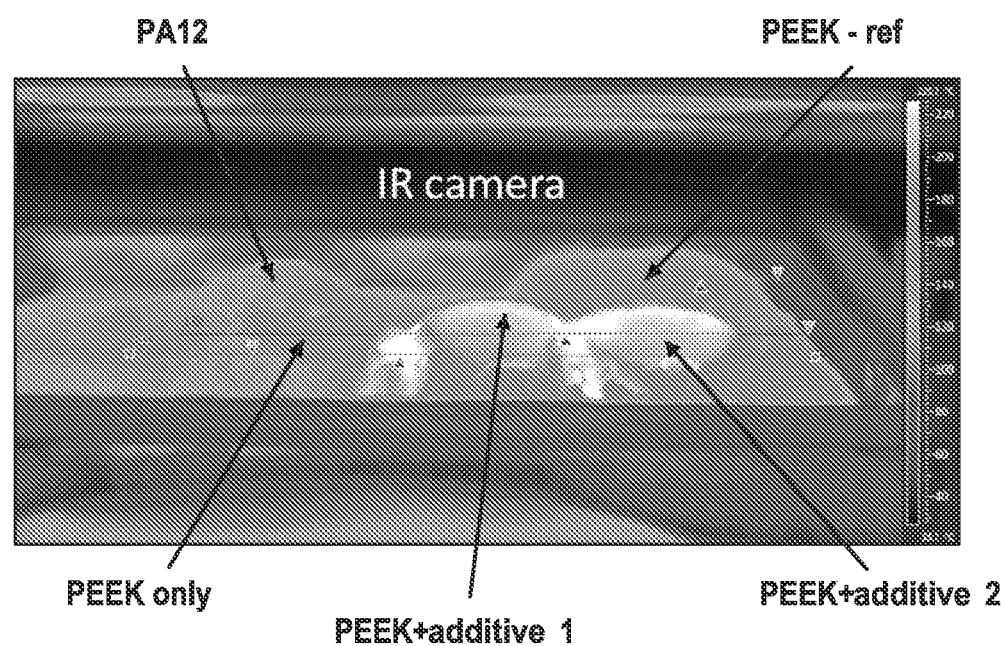
FIG. 9 is a black and white representation of an infrared image illustrating the temperature difference between two samples of PEEK powder without an example additive, and a sample of PEEK powder with two different example additives.

An image of the fabrication bed having PEEK (without any additive), PEEK with additive 1, and PEEK with additive 2 was taken with an IR camera. In addition, a sample of nylon 12 (labeled PA12) was included to show that heating rates of nylon 12 and PEEK (both without additive) were quite similar. A black and white representation of the original image is shown in FIG. 9. As depicted, the temperature of the areas of the bed having PEEK with additive 1 and PEEK with additive 2 thereon is significantly higher than the temperature of the areas of the bed having nylon 12 alone and PEEK alone thereon.

Example 3

The result of preheating of the 3D printer powder bed with overhead vis-IR halogen lamps operating at about 1900K (black body source) was captured when only stationary heating lamps were used. The powder bed contained two types of powder: nylon 12 alone (PA12) and a mixture of nylon 12 plus additive 7-1 (either 1 vol % or 0.5 vol %) (Table 3 in Example 1). An IR image of the powder bed showed that the temperature of the mixture of nylon 12 plus additive 7-1 rose much faster than nylon 12 alone.

Figure 10:
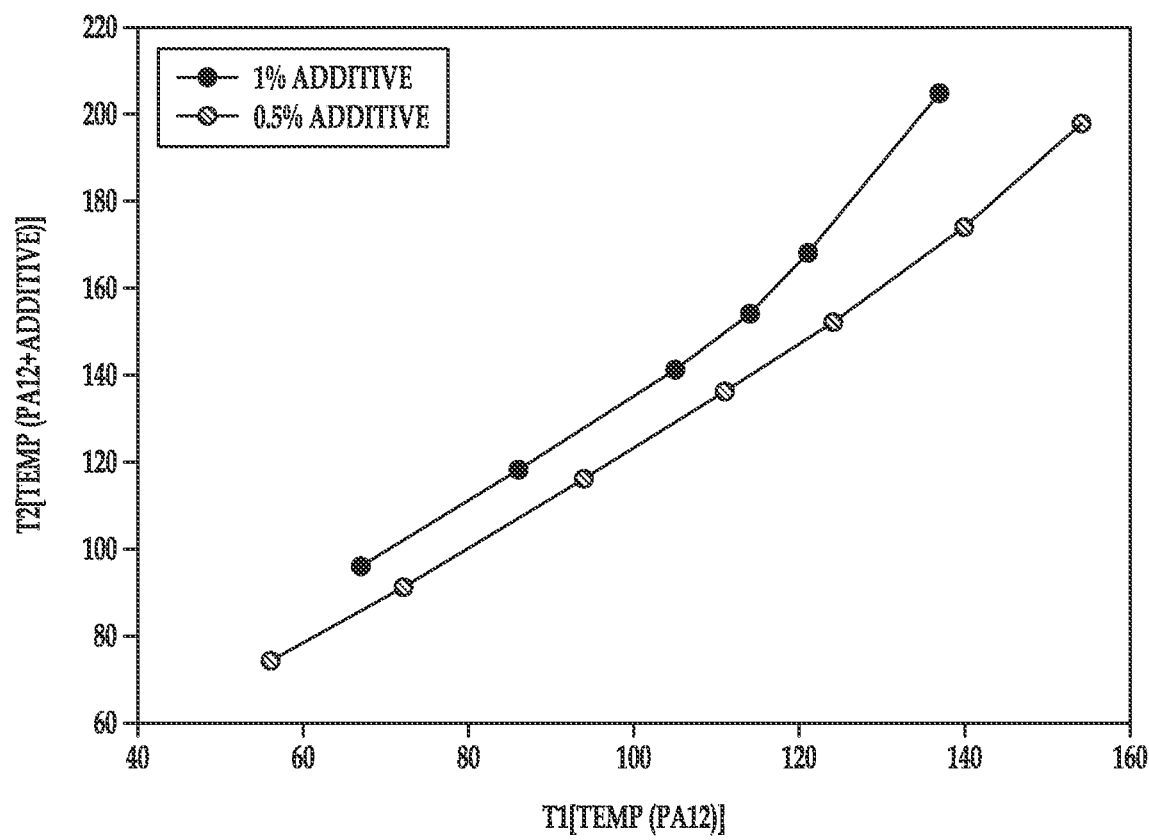
FIG. 10 is a graph depicting the temperature of nylon 12 without an example additive versus the temperature of nylon 12 with 0.5% or 1% of an example additive.

FIG. 10 illustrates the temperature of the PA12 alone versus the temperature of each of the build material compositions, which included PA12 and different concentrations of the 7-1 additive. As one example of the data shown in FIG. 10, when the PA12 alone was about 120° C., the PA12 with 0.5 vol % of the 7-1 additive was over 140° C. and the PA12 with 1 vol % of the 7-1 additive was about 170° C. In each instance, the temperature of the PA 12 alone was less than the temperature of the examples of the PA12 with the 7-1 additive.

While the data is not shown in FIG. 10, the PA12 without the additive never reached a temperature above 140° C. within the time of this heating experiment. In contrast, the temperature of the PA12 plus additive 7-1 rose above the nylon 12 melting point (>190° C.). This shows clear signs of melting and re-solidification; for example, solid shapes were formed, free of nylon 12 powder particles and showing signs of complete melting and solidification (translucency). This effect appears to be more pronounced when a larger amount of additive is present (1 vol % vs. 0.5 vol %).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 1 µm to about 100 µm should be interpreted to include not only the explicitly recited limits of about 1 µm to about 100 µm, but also to include individual values, such as 12 µm, 94.5 µm, etc., and sub-ranges, such as from about 30 µm to about 98 µm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional printing build material composition, comprising:
    polymer particles; and
    a radiation absorbing additive mixed uniformly with the polymer particles, the radiation absorbing additive having a particle size ranging from about 1 µm to about 100 µm, and the radiation absorbing additive capable of absorbing incident radiation having wavelengths ranging from 700 nm to 10 µm and wherein the radiation absorbing additive only allows less than 10% of incident radiation having wavelengths ranging from 600 nm to 700 nm to be absorbed, wherein the radiation absorbing additive is an organic near-infrared absorber selected from the group consisting of cyanines, phthalocyanines, tetraaryldiamines, triarylamines, metal dithiolenes, rare earth complexes, nonconjugated polymers, conjugated quinoid polymers, conjugated dye-containing polymers, donor-acceptor conjugated polymers, and combinations thereof.

2. The three-dimensional printing build material composition as defined in claim 1 wherein: the radiation absorbing additive further includes an inorganic near-infrared absorber and wherein the inorganic near-infrared absorber is selected from the group consisting of copper doped metal oxides, copper phosphates, metal-copper (II) pyrophosphates, di-cation pyrophosphates, mixed metal iron diphosphates, magnesium copper silicate, copper hydroxide phosphate, metal oxides, semiconductor nanocrystals, and combinations thereof.

3. The three-dimensional printing build material composition as defined in claim 1 wherein the polymer particles have a particle size ranging from about 1 µm to about 100 µm.

4. The three-dimensional printing build material composition as defined in claim 1 wherein the radiation absorbing additive is present in an amount up to 4 vol % of a total vol % of the build material composition.

5. The three-dimensional printing build material composition as defined in claim 1 wherein the polymer particles are selected from the group consisting of polyamides, polyethylene, polyethylene terephthalate (PET), polystyrene (PS), polyacetals, polypropylene, polycarbonate (PC), polyester, polyoxymethylene (POM), polyether ether ketone (PEEK), polyetherketoneketone (PEKK), polyphenylene sulfide (PPS), polytetrafluoroethylene (PTFE), polyvinylidene fluoride (PVDF), acrylonitrile styrene acrylate (ASA), poly(methyl methacrylate) (PMMA), styrene acrylonitrile (SAN), styrene maleic anhydride (SMA), poly(vinyl chloride) (PVC), polyethylenimine (PEI), and combinations thereof.

6. The three-dimensional printing build material composition as defined in claim 1 wherein the build material composition is capable of absorbing from about 1.5 times to about 10 times more of the incident radiation than the polymer particles without the radiation absorbing additive.

7. The three-dimensional printing build material composition as defined in claim 1, further comprising a flow aid present in an amount up to 2 vol % of a total vol % of the build material composition.

8. A three-dimensional printing build material composition, comprising:
    polymer particles; and
    a radiation absorbing additive mixed uniformly with the polymer particles, wherein the radiation absorbing additive is capable of absorbing from about 0.5% to less than 20% of incident radiation having wavelengths ranging from 700 nm to 10 µm and only allows less than 0.01% of incident radiation having wavelengths below 700 nm to be absorbed, wherein the radiation absorbing additive is an organic near-infrared absorber selected from the group consisting of cyanines, phthalocyanines, tetraaryldiamines, triarylamines, metal dithiolenes, rare earth complexes, nonconjugated polymers, conjugated quinoid polymers, conjugated dye-containing polymers, donor-acceptor conjugated polymers, and combinations thereof.

9. The three-dimensional printing build material composition as defined in claim 8 wherein:
    the radiation absorbing additive has a particle size ranging from about 1 µm to about 100 µm; and
    the polymer particles have a particle size ranging from about 1 µm to about 100 µm.

10. The three-dimensional printing build material composition as defined in claim 8 wherein: the radiation absorbing additive further includes an inorganic near-infrared absorber and wherein the inorganic near-infrared absorber is selected from the group consisting of copper doped metal oxides, copper phosphates, metal-copper (II) pyrophosphates, di-cation pyrophosphates, mixed metal iron diphosphates, magnesium copper silicate, copper hydroxide phosphate, metal oxides, semiconductor nanocrystals, and combinations thereof.

11. The three-dimensional printing build material composition as defined in claim 8 wherein:
    the radiation absorbing additive is present in an amount up to 4 vol % of a total vol % of the build material composition; and
    the build material composition optionally further comprises a flow aid present in an amount up to 2 vol % of a total vol % of the build material composition.

12. The three-dimensional printing build material composition as defined in claim 8 wherein the polymer particles are selected from the group consisting of polyamides, polyethylene, polyethylene terephthalate (PET), polystyrene (PS), polyacetals, polypropylene, polycarbonate (PC), polyester, polyoxymethylene (POM), polyether ether ketone (PEEK), polyetherketoneketone (PEKK), polyphenylene sulfide (PPS), polytetrafluoroethylene (PTFE), polyvinylidene fluoride (PVDF), acrylonitrile styrene acrylate (ASA), poly(methyl methacrylate) (PMMA), styrene acrylonitrile (SAN), styrene maleic anhydride (SMA), poly(vinyl chloride) (PVC), polyethylenimine (PEI), and combinations thereof.

13. The three-dimensional printing build material composition as defined in claim 8 wherein the build material composition is capable of absorbing from about 1.5 times to about 10 times more of the incident radiation having wavelengths ranging from 700 nm to 10 µm than the polymer particles without the radiation absorbing additive.

14. The three-dimensional printing build material composition as defined in claim 1, wherein an average particle size of the polymer particles and an average particle size of the radiation absorbing additive do not differ from more than 20 µm.

15. A three-dimensional printing build material composition, comprising:
   polymer particles;
   a radiation absorbing additive mixed uniformly with the polymer particles, the radiation absorbing additive having a particle size ranging from about 1 µm to about 100 µm, and the radiation absorbing additive capable of absorbing incident radiation having wavelengths ranging from 700 nm to 10 µm and wherein the radiation absorbing additive only allows less than 10% of incident radiation having wavelengths ranging from 600 nm to 700 nm to be absorbed; and
   wherein an average particle size of the polymer particles and an average particle size of the radiation absorbing additive are the same.

16. The three-dimensional printing build material composition as defined in claim 15 wherein,
   the radiation absorbing additive is an inorganic near-infrared absorber selected from the group consisting of copper doped metal oxides, copper phosphates, metal-copper (II) pyrophosphates, di-cation pyrophosphates, mixed metal iron diphosphates, magnesium copper silicate, copper hydroxide phosphate, metal oxides, semiconductor nanocrystals, and combinations thereof; or
   the radiation absorbing additive is an organic near-infrared absorber selected from the group consisting of cyanines, phthalocyanines, tetraaryldiamines, triarylamines, metal dithiolenes, rare earth complexes, non-conjugated polymers, conjugated quinoid polymers, conjugated dye-containing polymers, donor-acceptor conjugated polymers, and combinations thereof; or
   the radiation absorbing additive includes a combination of the inorganic near-infrared absorber and the organic near-infrared absorber.

17. The three-dimensional printing build material composition as defined in claim 15 wherein, the build material composition is capable of absorbing from about 1.5 times to about 10 times more of the incident radiation than the polymer particles without the radiation absorbing additive.

18. The three-dimensional printing build material composition as defined in claim 15 wherein, the radiation absorbing additive is present in an amount up to 4 vol % of a total vol % of the build material composition.

* * * * *